US 6,581,450 B1

(12) United States Patent
Steen

(10) Patent No.: US 6,581,450 B1
(45) Date of Patent: Jun. 24, 2003

(54) METHOD AND APPARATUS FOR ACCURATELY DETERMINING AN AMOUNT OF FUEL REQUIRED TO TRANSPORT A VEHICLE A KNOWN DISTANCE

(76) Inventor: John Steen, 125 Sherwood Street, Kingston, Ontario (CA), K7Q 1N7

( * ) Notice: Subject to any disclaimer, the term of this patent is extended or adjusted under 35 U.S.C. 154(b) by 271 days.

(21) Appl. No.: 09/706,131

(22) Filed: Nov. 3, 2000

(51) Int. Cl.$^7$ .............................................. G04D 7/00
(52) U.S. Cl. ........................................ 73/149; 33/722
(58) Field of Search ..................... 73/149, 290 B; 33/722–731; 283/23, 24; 235/69, 85 R, 61 M, 61 S, 124

(56) References Cited

U.S. PATENT DOCUMENTS

| | | | | |
|---|---|---|---|---|
| 1,475,183 A | * | 11/1923 | Harwood | 33/722 |
| 1,580,529 A | * | 4/1926 | Petree | 33/722 |
| 1,742,595 A | * | 1/1930 | Hoevel | 33/730 |
| 1,774,439 A | * | 8/1930 | Holtson | 33/728 |
| 4,212,195 A | * | 7/1980 | Young | |
| 4,445,370 A | * | 5/1984 | Whitmire | 33/723 |

* cited by examiner

*Primary Examiner*—Robert Raevis

(57) ABSTRACT

Traditional mechanical fuel gauges do not provide an accurate measurement of a vehicle's fuel capacity. As a result, vehicle manufacturer's incur considerable losses when delivering cars with unused fuel. The present invention, therefore, provides a method and system for accurately determining an amount of fuel required to transport a vehicle a known distance. This is achieved by utilizing a fuel measurement device (FMD) which can be inserted into a vehicles fuel tank. Upon removing the FMD from the fuel tank, one can then determine the amount of fuel that is required to travel a particular distance at a particular fuel consumption rate. In a preferred embodiment of the invention, the FMD is held by a holding device. The purpose of the holding device is to minimize the size of the FMD such that the FMD can be disposed of with minimal waste.

5 Claims, 2 Drawing Sheets

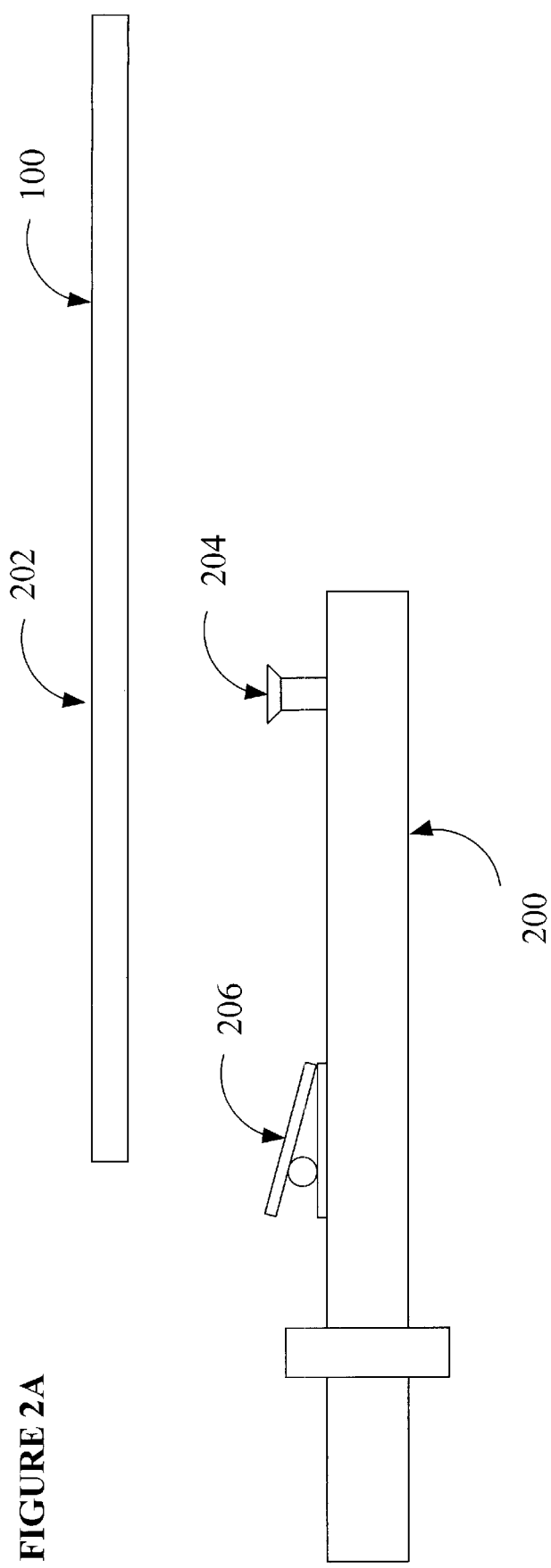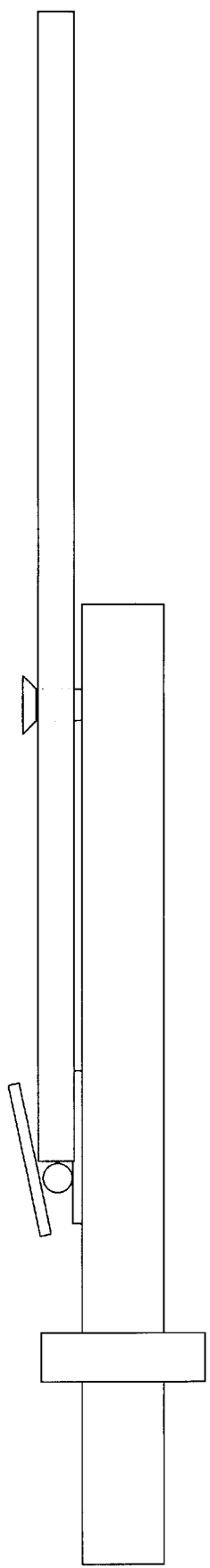
FIGURE 2A
FIGURE 2B

METHOD AND APPARATUS FOR ACCURATELY DETERMINING AN AMOUNT OF FUEL REQUIRED TO TRANSPORT A VEHICLE A KNOWN DISTANCE

FIELD OF THE INVENTION

The present invention relates to a method and apparatus for accurately determining an amount of fuel required to transport a vehicle a known distance.

BACKGROUND OF THE INVENTION

It is well-known that commercially available vehicles are commonly equipped with fuel gauges. The most common type of fuel gauge utilized is a mechanical device which provides a relative measurement of a vehicle's available fuel. Typically, these devices display the following increments of available fuel: Empty, ¼, ½, ¾, and Full.

One drawback of such a system of fuel measurement is that one cannot determine with any accuracy the distance one can travel on the relative amount of fuel displayed. This drawback is particularly problematic in the context of delivering vehicles from a manufacturer to a dealer.

When a vehicle is ready for delivery to a dealer, a manufacturer must provide that vehicle with enough fuel to ensure its arrival. If a manufacturer relies exclusively on traditional fuel gauges, the amount of fuel will inevitably be overcompensated. This is because there is no way to accurately assess the actual amount of fuel that is required. Thus, the excess fuel remaining in each vehicle represents a loss to the manufacturer.

Several attempts have been made to address this problem. One such attempt is an automatic fuel gauge which provides an electronic readout of the distance a vehicle can travel based on the amount of fuel in that vehicle's tank. These devices, however, are generally inaccurate for most fuel levels other than a full tank. At best, therefore, these devices merely provide a rough estimate of the distance a vehicle can travel based on a particular amount of fuel.

Similarly, other devices have attempted to address this problem by providing a fuel gauge which measures the amount of fuel expended by a vehicle. These devices do not, however, provide an indication of how much fuel remains in the vehicle. Consequently, these devices cannot provide an accurate indication of how far a vehicle can travel on the remaining fuel.

A need exists, therefore, for an improved method of determining fuel levels in vehicles.

SUMMARY OF THE INVENTION

It is, therefore, an object of the invention to provide a method and apparatus for accurately determining an amount of fuel required to transport a vehicle a known distance.

One aspect of the invention is defined as a method for accurately determining an amount of fuel required to transport a vehicle a known distance comprising the steps of determining the volume of the vehicle's fuel tank as a function:)n of the height of the tank; determining the distance the vehicle can travel as a function of fuel volume; placing a fuel measurement device into the fuel tank in order to determine the volume of fuel present therein; wherein the fuel measuring device has a plurality of volume and distance indicators labelled thereon, and wherein the volume and distance indicators correspond to the height of the tank; and determining the amount of fuel required by referring to the distance indicators which correspond to the volume of fuel present in the tank.

Another aspect of the invention is defined as an apparatus for accurately determining an amount of fuel required to transport a vehicle a known distance comprising: an elongated measuring device; wherein the elongated measuring device includes a plurality of volume indicators depicting the volume of fuel in the vehicle's fuel rank as a function of the height of the tank; wherein the fuel measuring device includes a plurality of distance indicators depicting the distance the vehicle can travel as a function of the fuel volume in the vehicle's fuel tank; wherein the elongated measuring device is adapted to fit into the vehicle's fuel tank; and wherein the elongated measuring device exhibits a noticeable change in characteristic when submerged in fuel.

BRIEF DESCRIPTION OF THE DRAWINGS

These and other features of the invention will become more apparent from the following description in which reference is made to the appended drawings in which:

FIG. 2A presents a schematic representation of an apparatus for accurately determining an amount of fuel required to transport a vehicle a known distance in accordance with a preferred embodiment of the invention;

FIG. 2B presents a schematic representation of an apparatus for accurately determining an amount of fuel required to transport a vehicle a known distance in accordance with a preferred embodiment of the invention.

DETAILED DESCRIPTION OF THE INVENTION

Figure 1:
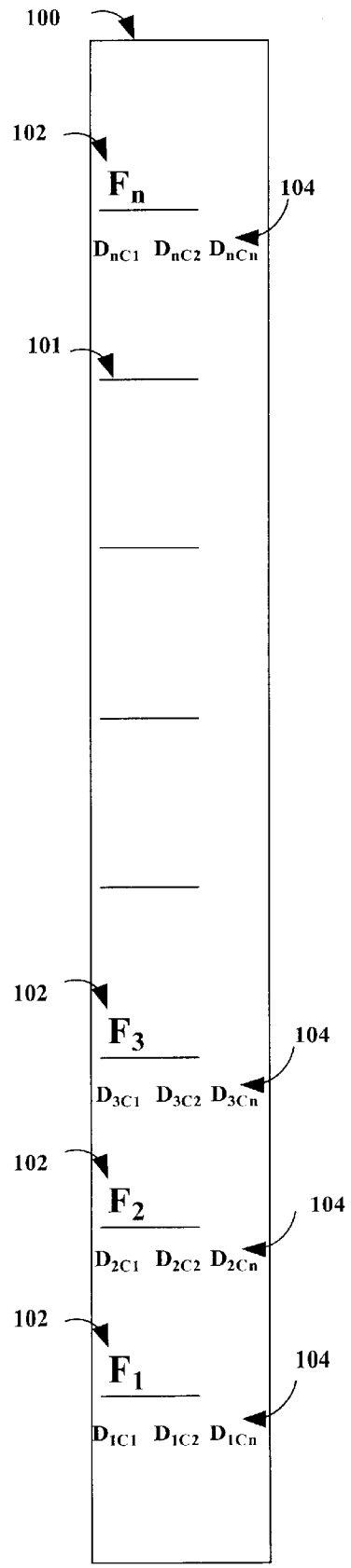
FIG. 1 presents a schematic representation of an apparatus for accurately determining an amount of fuel required to transport a vehicle a known distance in accordance with a broad embodiment of the present invention.

The present invention is directed to a method and apparatus for accurately determining an amount of fuel required to transport of vehicle a known distance.

A schematic representation of an apparatus for accurately determining an amount of fuel required to transport a vehicle a known distance is shown in FIG. 1. The apparatus is hereinafter referred to as a fuel measurement device (FMD). As shown in FIG. 1, the FMD 100 is labelled with a plurality of markers 101. These markers are further labelled with fuel volumes 102 and distances 104. As one can see from FIG. 1, multiple distances are shown for each fuel volume. This is because the distance a vehicle can travel on a particular volume of fuel is dependant upon that vehicle's fuel consumption rate. Thus, each distance label is presented as $D_{nC_n}$, where $D_n$ is the distance one can travel on a volume of fuel and $C_n$ is the consumption rate. The process of determining each of these values for a particular fuel tank is presented below in greater detail.

The amount of fuel required to transport a vehicle a known distance is measured in the following way. First, the FMD is inserted into a vehicle's fuel tank. The FMD is then removed and the level of the fuel is ascertained by observing the highest point at which the FMD was submerged in the fuel. After determining the level of fuel in the tank, one can determine the volume of fuel required to travel a particular distance at a particular consumption rate by referring to the various labels on the FMD.

For example, assume a vehicle's fuel tank is empty. One can determine the amount of fuel required to travel a particular distance (D) in the following manner. First, one must determine what the vehicles average fuel consumption rate for the trip will be. This is because, as mentioned above, the distance a vehicle can travel on an amount of fuel is dependant on that vehicle's consumption rate. A vehicles fuel consumption rate for city and highway driving is typically provided by a vehicle's manufacturer. Once the consumption rate is known, therefore, the amount of fuel required to travel the particular distance is determined by finding the distance label 104 for a specific consumption rate which exceeds the particular distance. The amount of fuel is then determined by reading off the fuel volume label 102 which corresponds to the appropriate distance label.

In the event that the fuel tank is not empty the process of determining the volume of fuel required is slightly different. First, one must determine the particular distance the vehicle must travel. Next, one must determine the distance the vehicle can travel given the amount of fuel in the tank and The vehicle's fuel consumption rate. This is determined by merely placing the FMD into the tank and reading off the appropriate distance label 104. One can then determine the remaining distance that the vehicle must travel for which excess fuel is required. This distance is measured by taking the difference between the particular distance and the distance the vehicle can presently travel. Once this distance is known, one can then refer to the nearest appropriate distance label 104 which exceeds the remaining distance. Upon determining this distance, one can determine the amount of fuel required by finding the fuel volume label 102 which corresponds to the appropriate distance label.

In the preferred embodiment of the invention the FMD is made out of wood. This is because wood, when submerged in liquid fuel, typically exhibits a colour change. Thus, the level of fuel can be determined by assessing the differing colours of the FMD. The present invention, however, is not limited to being made out of wood. As will be apparent to one skilled in the art, the FMD can be made of any material which exhibits a characteristic change when submerged in liquid fuel.

As a result of being physically submerged in fuel, it is preferred that the volume of the FMD be minimized. This is because the FMD will displace an amount of fuel equal to its submerged volume thereby giving the impression that there is more fuel than is actually present. Thus, by minimizing the FMD's volume this effect becomes negligible.

Given that most vehicles have different fuel tanks and consumption rates, the various labels (i.e. distances 102, fuel volumes 104) displayed on the FMD will differ for each particular vehicle type. Thus, in order to utilize the FMD one must be able to ascertain the appropriate labels for each vehicle. The labels on the FMD can be determined in the following manner.

First, one must determine the volume of a vehicle's fuel tank as a function of height. One should note, however, that it is not necessary that the FMD be perpendicularly placed into the tank. The FMD will function properly regardless of the angle at which the volume to height measurement is made, Provided that the same angle is used for all future amendments. As will be apparent to one skilled in the art, this measurement can be performed by a variety of methods ranging from a complex mathematical analysis to simple experimentation. Once the volume of the tank as a function of height is known, the various markers 101 can be labelled with the corresponding fuel volumes 102. For example, in the case of a 40 gallon tank, the markers could be set at 5 gallon intervals.

After determining the volume as a function of height, distance labels 104 relating to the volume labels can be determined by calculating the product of a particular volume and consumption rate.

Referring to FIGS. 2A and 2B, the FMD 100 described in FIG. 1 is shown in a preferred embodiment of the invention. One should note that the FMD 100 shown in FIGS. 2A and 2B is presented as a side view.

According to the preferred embodiment of the invention the FMD 100 is designed to fit onto a holding mechanism 200. The holding mechanism is incorporated into the in embodiment of the present invention such that the FMD 100 itself can be discarded after each measurement session. This avoids the unnecessary contact of tools and equipment with fuel remaining on the FMD. The holding mechanism is further beneficial in that it can minimize the size of the FMD and, consequently, the amount of waste associated with discarding the FMD. Otherwise, in the absence of such a holding device, the amount of waste would be greatly increased as a large portion of the FMD is not utilized for measurement, but rather for holding purposes.

To achieve a mating of the FMD 100 with the holding device 200 a hole 202 is drilled into the FMD 100. Similarly, the holding mechanism 200 includes a fastener 204 and a clamp 206 for holding the FMD 100. The FMD 100, therefore, is engaged into the holding device by placing the fastener 204 through the hole 202 and clamping the free end of the FMD with the clamp 206. FIGS. 2A and 2B show the FMD 100 in a disengaged and engaged position respectively.

As will be apparent to one skilled in the art the fastener 204 can include a bolt, screw, nail, rivet, or any similar fastening device which can prevent the FMD from being disengaged from the holding device. Correspondingly, one skilled in the art will appreciate that the fastener 204 does not have to be a separate and distinct part but could be incorporated into the holding device itself. One skilled in the art will also appreciate that the present invention could incorporate numerous different types of clamps for holding the FMD. Thus, the present invention is not limited by the clamp 206 shown in FIGS. 2A and 2B.

As one can see the present invention is advantageous in that one can accurately determine the amount of fuel required to transport a vehicle a known distance. As a result, the aforementioned losses due to unused fuel are minimized.

While particular embodiments of the present invention have been shown and described, it is clear that changes and modifications may be made to such embodiments without departing from the true scope and spirit of the invention. Thus, it is intended that the present invention cover the modifications and variations of this invention provided they come within the scope of the appended claims and their equivalents.

What is claimed is:

1. A method for accurately determining an amount of fuel required to transport a vehicle a known distance comprising the steps of:

determining the volume of said vehicle's fuel tank as a function of the height of said tank;

determining the distance said vehicle can travel as a function of fuel volume;

placing a fuel measurement device into said fuel tank in order to determine the volume of fuel present therein;

wherein said fuel measuring device has a plurality of volume and distance indicators labelled thereon, and wherein said volume and distance indicators correspond to the height of said tank; and determining the amount of fuel required by referring to said distance indicators which correspond to the volume of fuel present in said tank.

2. A method for accurately determining an amount of fuel require to transport a vehicle a known distance as claimed in claim 1, wherein said step of determining the distance said vehicle can travel as a function of fuel volume includes determining the average fuel consumption rate of said vehicle for the known distance to be travelled.

3. An apparatus for accurately determining an amount of fuel required to transport a vehicle a known distance comprising:

an elongated measuring device;

wherein said elongated measuring device includes a plurality of volume indicator depicting the volume of fuel in said vehicles's fuel tank as a function of the height of said tank;

wherein said fuel measuring device includes a plurality of distance indicators depicting the distance said vehicle can travel as a function of the fuel volume in said vehicle's fuel tank;

wherein said elongated measuring device is adapted to fit into said vehicle's fuel tank; and wherein said elongated measuring device exhibits a noticeable change in characteristic when submerged in fuel.

4. An apparatus as claimed in claim 3, wherein said apparatus further includes a holding device for engaging said fuel measuring device.

5. An apparatus for accurately determining an amount of fuel required to transport a vehicle a known distance as claimed in claim 3, wherein said plurality of distance indicators relate to a plurality of fuel consumption rates for said vehicle.

* * * * *